Aug. 17, 1954 L. E. PILLA 2,686,314

UNIVERSAL SHOULDER CONSTRUCTION FOR GARMENTS

Filed April 21, 1952 2 Sheets-Sheet 1

INVENTOR.
LUCIAN E. PILLA
BY [signature]
ATTORNEY

Aug. 17, 1954 L. E. PILLA 2,686,314

UNIVERSAL SHOULDER CONSTRUCTION FOR GARMENTS

Filed April 21, 1952 2 Sheets-Sheet 2

INVENTOR.
LUCIAN E. PILLA
BY Zoltan H. Polachek
ATTORNEY

Patented Aug. 17, 1954 2,686,314

UNITED STATES PATENT OFFICE 2,686,314

UNIVERSAL SHOULDER CONSTRUCTION FOR GARMENTS

Lucian E. Pilla, New York, N. Y., assignor to Henry L. McCarthy, as Commissioner of Welfare of the City of New York Application April 21, 1952, Serial No. 283,283

4 Claims. (Cl. 2—93)

This invention relates to garment construction and particularly concerns an improved construction for the shoulder and front portions of a coat.

At the present time, a large percentage of the clothing fabricated is of the "ready-made" type, as is well known. Considerable savings are initially effected by the manufacture of suits based on an average figure from pieces of cloth cut to a uniform contour and size, and then sewn together to form completed garments. It is often found that alterations are subsequently necessary in a garment so made in order to assure a properly fitting coat to accommodate irregularities or deviations from the average figure in the physique of the wearer. These alterations are often costly and difficult to make and add substantially to the original cost of the garment.

In accordance with this invention, the shoulder portion and the front of a coat, which customarily is that part most likely to offend in the way of presenting an ill-fitting, bulging, wrinkling effect, particularly should any natural defect or irregularity exist in the wearer's shoulder, is constructed to correct such defect or irregularity by presenting a high and straight shoulder with a pleasingly full front effect of the shoulder to the front edge of the arm holes or junction of the sleeves.

The geometrical design for the shoulder construction is such as to provide an inner portion having a movable resilient upstanding wall to furnish ample room for forward shoulder movement at the front of the armhole and is adapted to afford freedom of movement to the adjacent arm and thereby compensates for any deformities of the wearer's shoulders. It also provides a minimum of padding in the shoulders but nevertheless gives the shoulders a well rounded appearance. It also avoids wrinkling at the back neck gorge of the collar.

This new shoulder and body front construction of a coat gives a much desired appearance and lines; and the shoulders of the wearer, regardless of their size and shape, will fall naturally upwards and forward to the front of the armholes, thus eliminating alterations on the shoulder portions of the garment.

A well-fitted coat, wherein the collar fits snugly to the neck and the front of the coat lies closely to the waistline, is also accomplished by the invention.

From an economic standpoint, the saving in labor and time by eliminating the alterations generally required is considerable, as pointed out above. Additionally, there are advantages in a ready-made garment, which presents a neat, well-tailored and stylish appearance and the comfortable feeling accompanying a good fit in spite of one's personal physical limitations with his shoulders properly corrected and dignified looking.

It is therefore a principal object of this invention to provide in the shoulders of a coat a portion with movable roomy, high walls.

Another object is to provide a novel simplified construction of a well fitted coat which will increase production and reduce cost of manufacture.

It is another object to eliminate the necessity for customary alterations to a coat to present a straight shoulder and front appearance.

Another object is to provide a shoulder construction for a coat that will hold the collar of the coat close to the neck of the wearer, and the front of the coat close to the waistline of the wearer.

A further object is to provide a novel coat construction that will insure a high shoulder line, particularly at the forward front portion, in order to provide comfort and freedom for the wearer.

It is a further object to provide a shoulder construction for a coat that will eliminate the conventional use of an excessively heavy shoulder pad.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
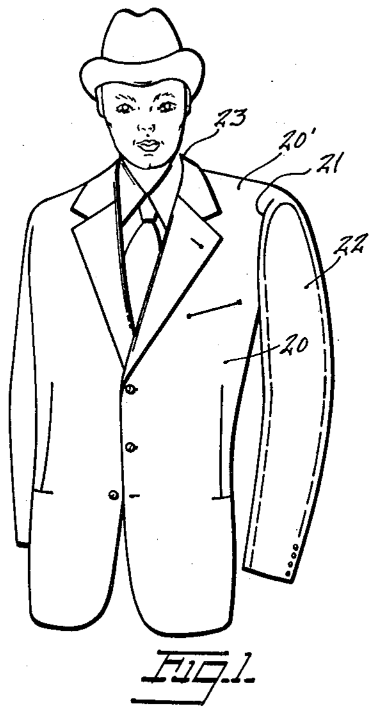
Fig. 1 is a front perspective view of a coat assembled in accordance with the invention.

Referring now to the drawings wherein similar characters of reference indicate corresponding parts, Fig. 1 shows a coat embodying the present invention. It will be noted that the front shoulder panel 20 is made high to front edge 21 of the armhole of sleeve 22. The inner edge 23 of the coat shoulder panel lies close to the neck of the wearer.

The upper portion 20' of panel 20 is cut high and forward. This highly desirable shaping of the coat shoulder compensates for backward sloping and downward drooping shoulder conditions found in most coat wearers. The high forward coat shoulders shaping is obtained, according to the invention, by the use of cut fabric pieces assembled in a novel manner, as will be explained in detail below. Thus, use of conventional excessively heavy shoulder pads is avoided and the cost wearer consequently has full freedom of arm movement within the coat while the coat remains neatly in place with edge 23 lying close to the neck of the wearer.

Figures 2, 3, 4, 5, 6, 7, 8:
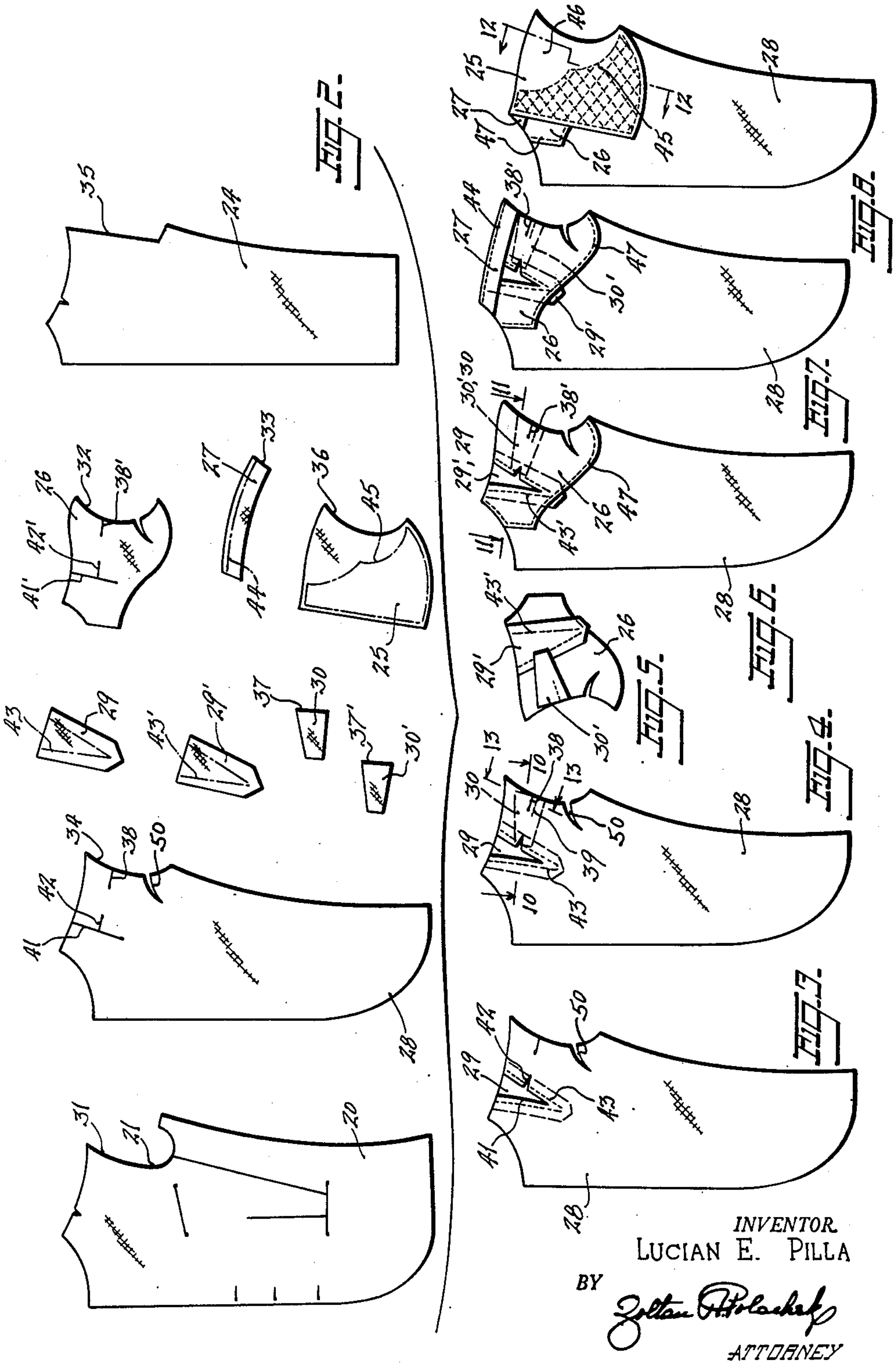
Fig. 2 is an elevational view of the patterns of the principal fabric pieces which comprise the coat shoulder construction according to the invention.
Fig. 3 is an elevational view of a canvas panel with an attached rear reinforcing piece.
Fig. 4 is a view of the assembly, similar to Fig. 3, with an additional superimposed rear reinforcing piece.
Fig. 5 is an elevational view of the rear of an assembly of pieces to be fastened to the assembly of Fig. 4.
Fig. 6 is an elevational view corresponding to Fig. 4 with the assembly of Fig. 5 fastened to the front thereof.
Fig. 7 is a view corresponding to Fig. 6 with superimposed shoulder strip.
Fig. 8 is a view corresponding to Fig. 7 with a superimposed felt liner.

Fig. 2 shows the various pieces which are assembled to form the semi-soft, high, forward standing coat shoulder above described. The pieces, shown disposed from left to right, are to be superimposed upon each other with front panel 20 uppermost, the other pieces beneath and rear panel 24 lowermost.

In order to simplify the showing of the invention, the collar, lapel, lining, pocket and other fabric pieces of conventional structures have been omitted, as well as the conventional pieces forming the rear portion of the coat which would be joined to the front portion pieces, herein shown, at the tops thereof.

The pieces shown in Fig. 2 comprise the front panel piece 20, a felt liner 25, canvas or hair cloth reinforcing piece 26, shoulder strip 27, soft canvas panel 28, canvas reinforcement pieces 29, 29', 30, and 30', and back panel 24. Of special significance is the substantially straight line edge 31 of the armhole portion 21 of the front panel 20. By use of this straight edge, in conjunction with other features of the invention, the amount of time, skill and labor normally required to sew and press the shoulder seams are greatly reduced. In conventional coat construction, curved lines are required, of necessity, to form the armhole seams. It is also more difficult and expensive to sew and to press on curved lines than to sew and press on straight lines. This straight edge is carried through on straight edges 31, 36, 33, 32, 37', 34, and 37 and 35 of pieces 20, 25, 27, 26, 30', 28, 30 and 24 respectively. All of these straight edges are superimposed in alignment when the pieces are assembled. The straight edges 31, 32, 34 and 36 appear somewhat curved in the drawing but they are substantially straight at their upper portions, after being pressed straight.

Figure 9:
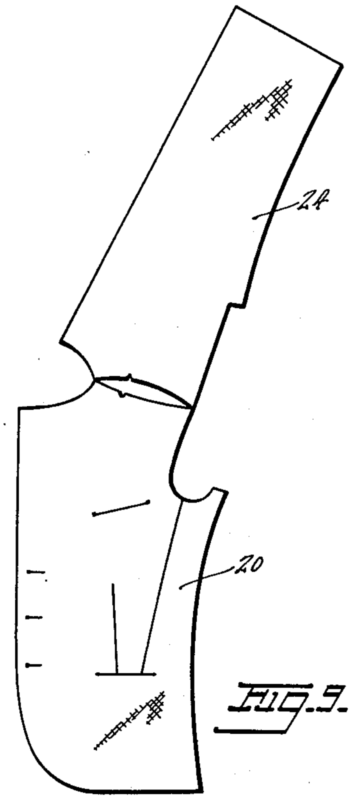
Fig. 9 is an elevational view of front and rear panels at one stage of assembly thereof.

However, the most essential and basic part in the assembly of the shoulder construction of this invention is the proper cutting and proper sewing of the front cloth panel 20 to the rear cloth panel 24 at the curve of the shoulders, as shown in Fig. 9.

Figure 10:
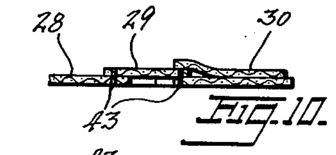
Fig. 10 is a sectional view taken on line 10—10 of Fig. 4.
Figure 11:
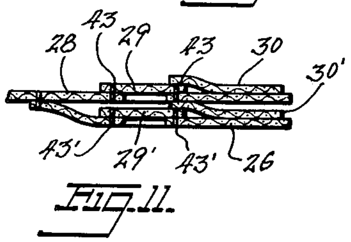
Fig. 11 is a sectional view taken on line 11—11 of Fig. 6.
Figures 12, 13, 14, 15:
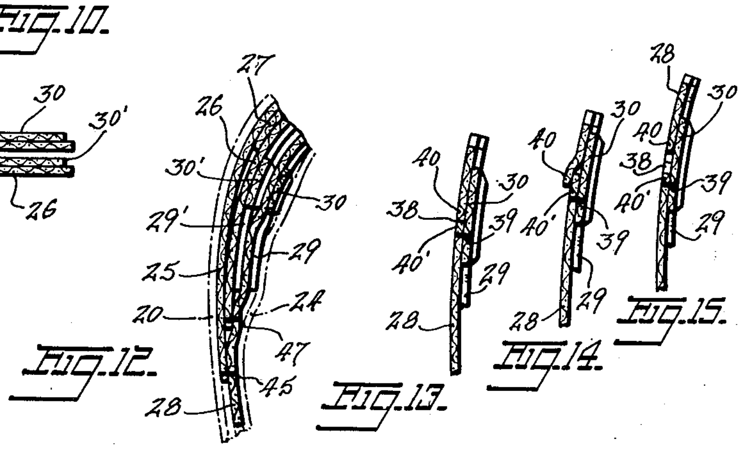
Fig. 12 is a sectional view taken on line 12—12 of Fig. 8.
Fig. 13 is a sectional view taken on line 13—13 of Fig. 4.
Fig. 14 is a view corresponding to Fig. 13 showing the movable wall portions of the canvas panels.
Fig. 15 is another view similar to Fig. 13 showing the movable wall portions of the canvas panels.

The manner of assembly of the various panels and pieces is shown in Figs. 2 to 13 with Figs. 3 to 8 showing the progressive steps in sewing the pieces together. In Fig. 2, the top of the canvas panel 28 is provided with a cut 41 and a smaller cut 42 perpendicular to cut 41. The edges of the V-shaped cut 50 are sewed together to give the rounding of the chest. V-shaped canvas reinforcing piece 29 is sewed to the edges of cut 41 along the dotted lines 43. The effect produced is to spread apart the edges of cuts 41 and 42, as shown in Fig. 3, and to impart a curvature to the panel which is effective in part in producing the high curved top of the shoulder which is a principal feature of this invention. Also of importance to the invention is the manner of forming the movable wall within the shoulder construction so that it falls by itself without any further work. It will be noted that canvas panel 28 is cut at 38 from the armhole side. Canvas piece 30 is attached to the armhole side of the rear of panel 28, as shown in Figs. 4, 10 and 13, covering the cut 38 and overlapping piece 29 and is secured by a single line of stitching 39 beneath cut 38. Canvas piece 30' is attached to the rear of canvas reinforcement piece 26 overlapping piece 29', as shown in Fig. 5.

The assembly of pieces 26, 29' and 30' is then superimposed on panel 28, as shown in Figs. 6 and 11, with pieces 30 and 30' on opposite sides of the free cut 38. Figs. 13, 14 and 15 show how the shoulder construction adapts itself to kinds of shoulders and yet yields in response to arm movement to insure full freedom of action to the wearer. In Fig. 13, the portions of the panel 28 at cut 38 are in normal, unmoved position with the portions 40 and 40' forming the upper and lower sides of cut 38 adjacent each other.

In Fig. 14 is shown how the sides 40, 40' of cut 38 overlap each other to foreshorten the armhole edge of panel 28.

As shown in Fig. 15, the sides 40, 40' separate and assume a V shape to lengthen the armhole edge of panel 28. The sides 40, 40' are able to slide freely between the canvas pieces 29, 29' disposed at both sides of cut 38 as shown in Figs. 6 and 12.

The assembly of the pieces proceeds from Fig. 6 with the stitching of shoulder strip 27 over reinforcement piece 26 along line 44. Note that in the assembly of reinforcement piece 26, cuts 41' and 42' are provided which align with cuts 41 and 42 in panel 28 and piece 26 assumes the same curved contour as panel 28, as hereinbefore explained, when piece 29' is attached to piece 26 with stitching along dotted lines 43' opening cuts 41' and 42'. A cut 38' is made in reinforcement piece 26 and its edges function as does cut 38 to separate or overlap as the armhole edge of reinforcement piece lengthens or shortens in response to arm and shoulder movement of the wearer or to conform to the shoulders of different configuration and contour as required. Reinforcement piece 26 is stitched to panel 28 along line 47, as shown in Figs. 6 and 7.

Over the assembly of Fig. 7 is placed felt piece 25, stitched in a limited area bounded by line 45 leaving an unstitched area 46. The unstitched area leaves the underlying unstitched edges of cuts 38, 38' free to move to lengthen or shorten the armhole edge of the pieces, as required.

In Fig. 12, the final assembly of pieces is shown with front panels 20 and rear panel 24 yet to be assembled. The curvature of the shoulder construction even before front and rear panels are added is clearly apparent from Fig. 12. This highly placed forward standing curvature at the top of the assembled panels and pieces is achieved without as much padding, as in conventional coat shoulder constructions, and is inherently adaptable for self-lengthening for self-shortening as hereinbefore explained. It is this inherent high curvature and adaptability to fit any kind of shoulder which characterizes the present construction embodying the invention.

A "soft" construction may be made, having the same well fitted upstanding appearance as the semi-soft construction, but having the advantage of being lighter in weight, by using only panel 28, canvas reinforcing piece 29 and felt piece 25.

The invention, as above described, thus permits manufacture of coats on a mass production basis with all the economies experienced thereby and at the same time insures that the garment is adaptable to a great diversity of shoulder shapes without requiring hitherto necessary extensive and costly alterations.

It is to be understood that my new geometrical garment design covers up any physical defects of shoulders and adjacent parts of the body. This construction eliminates the need of costly alterations for building up or padding the garment to fit people with physical defects or irregularities at or near the shoulders, especially when one shoulder is higher that the other (common in most people), and effectively reduces the ultimate cost of the garment by eliminating the necessity of ripping the entire shoulder and opening the neck gorge.

A garment made by this new "standup" wall construction always automatically produces both shoulders exactly alike. Thus, a garment of this kind tends to stimulate clothing business and increase sales volume.

Since this geometrically and scientifically designed shoulder and front arrangement fits various shaped people, it will also save the time of both salesmen and customers of ready made garments in selecting a properly fitting garment. The garment creates a youthful appearance in the wearer because it compensates for inherent defects and deviations in the wearer's figure from the average model.

All the operations for the construction of the garment are relatively flat, inexpensive and simple but the garment has the appearance of having been subjected to the expensive drawing, pulling and stretching operations customary both in expensive ready made and in custom tailored clothing. The garments maintain a fresh look at all times, because they are never wrinkled and/or puckered by high humidity, damp weather and the like, without constant expense of repressing, thus extending the life of the garment.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A geometrically shaped coat shoulder construction comprising a plurality of superimposed panels, one of said panels having a cut portion transversely disposed to an outside edge, a first reinforcement piece sewed to one side of said panel and another reinforcement piece sewed to the other side of said panel, said pieces covering said cut portion whereby adjacent edges of said cut portion are free to move with respect to each other, one of said reinforcement pieces including a transverse shoulder strip.

2. A coat shoulder construction comprising a plurality of superimposed panels shaped to a geometrically curved contour, said panels consisting of front and back panels with a canvas panel therebetween, a plurality of V-shaped canvas pieces sewed to a cut portion of the canvas panel, a canvas reinforcing piece and an elongated shoulder piece superimposed on said canvas panel, a felt piece superimposed on the reinforcing piece and sewed to said panel, a certain portion of said felt piece being unsewed, and a plurality of canvas pieces sewed to said canvas panel with a cut unsewed portion of the canvas panel therebetween, the cut unsewed portion underlying the unsewed portion of the felt piece.

3. A coat shoulder construction comprising a plurality of superimposed panels shaped to a curved high rounded contour adjacent the top thereof, said panels consisting of front and back panels with a canvas panel therebetween, a plurality of V-shaped canvas sections sewed to a top cut portion of the canvas panel, a canvas reinforcing piece and an elongated shoulder piece superimposed on said canvas panel, a felt piece superimposed on the reinforcing piece and sewed to said panel, a certain portion of said felt piece being unsewed, and a plurality of canvas pieces sewed to said canvas panel with a side cut portion of the canvas therebetween, the side cut portion underlying the unsewed portion of the felt piece and having adjacent unsewed edges, all of said panels and all of said pieces having one substantially straight edge in alignment to form a portion of an armhole, the said side cut portion terminating at said straight edge whereby the canvas panel armhole edge is free to shorten and lengthen in response to various shoulder configurations.

4. A coat shoulder construction comprising a canvas panel, a reinforcement piece superimposed on said panel with armhole edges in alignment, said panel and said piece each having a cut disposed transversely to said armhole edges with adjacent sides of the cuts unsewed, a first canvas piece disposed between said panel and reinforcement piece with one edge in alignment with the armhole edges, another canvas piece disposed on the outside of the panel opposite the first canvas piece and a felt piece superimposed on said reinforcement piece, whereby the said adjacent sides of the cuts are free to move between the canvas and felt pieces to lengthen and shorten the said armhole edges to conform the coat shoulder to the figure of the wearer.

References Cited in the file of this patent

UNITED STATES PATENTS

| Number | Name | Date |
|---|---|---|
| 642,031 | Winter | Jan. 23, 1900 |
| 858,319 | Adams | June 25, 1907 |
| 1,683,226 | Zuck | Sept. 4, 1928 |
| 2,550,532 | Cipkar | Apr. 24, 1951 |